Aug. 1, 1950  E. J. SCHAEFER  2,516,922

SWITCH MECHANISM

Filed March 28, 1947

INVENTOR.
Edward J. Schaefer
BY Wiedling and Krust
Attorneys

Patented Aug. 1, 1950

2,516,922

UNITED STATES PATENT OFFICE 2,516,922

SWITCH MECHANISM

Edward J. Schaefer, Fort Wayne, Ind.

Application March 28, 1947, Serial No. 737,809

14 Claims. (Cl. 200—80)

My invention relates in general to a throw-out switch for disconnecting the starting windings of an electric motor when the motor has reached a predetermined speed and in particular to a centrifugally operated throw-out switch which may be actuated by the shaft of a motor.

It is often advisable to use an electric motor which has a starting winding to obtain a high torque at the starting of the motor and at low running speed of the motor. When the motor has reach a predetermined speed, the starting winding may be disconnected. Therefore, it is an object of my invention to provide a quick acting throw-out switch for disconnecting the starting winding of an electric motor.

Another object of my invention is the provision of a centrifugally operated quick-acting throw-out switch which may be connected to a motor shaft to disconnect the starting winding of the motor when the motor reaches a predetermined speed.

Another object of my invention is the provision of a centrifugally operated quick-acting throw-out switch which may be connected to a motor shaft to disconnect and connect an electrical circuit when the motor reaches a predetermined speed.

Another object of my invention is to provide a knife edge, on which the actuating member may pivot, by punching an opening through a support portion and bending that support portion at the opening whereby a wall of the opening and the surface of the support portion form the knife edge therebetween.

Another object of my invention is to provide the actuating member and support bracket with interlocking surfaces which prevent them from becoming disconnected while fastened to the motor shaft.

Another object of my invention is the provision of a centrifugally operated quick-acting switch having a spring which restrains actuation of the switch until the motor has reached a predetermined speed, and which rapidly decreases the restraining effect of the spring when the switch begins to actuate.

Another object of my invention is the provision of a switch with a blade having a press member fastened thereto and on which an actuating member may be moved without varying the force exerted on the blade by movement of the actuating member.

Another object of my invention is to provide an actuating device in which the restraining force against pivotal movement rapidly decreases as the actuating member is pivotally moved away from the shaft of a motor by centrifugal force.

Another object of my invention is the provision of a throw-out switch in which the support bracket is secured to the shaft of the motor and rotates therewith and in which an actuating member is pivotally mounted on the support bracket to operate the switch when the motor shaft reaches a predetermined speed.

Another object of my invention is the provision of a support bracket for pivotally supporting an actuating member in which a portion of the bracket has an opening therethrough with a wall of the opening and the surface of that portion forming a pivot knife edge therebetween.

Another object of my invention is to provide a support bracket having a pivot knife edge on which an actuating member may be pivotally mounted with the pivot knife edge formed in a tab portion by the intersection of the wall of an opening and a surface of the tab when the tab is in a plane at an angle to the plane of the support bracket.

Another object of my invention is the provision of a blade for a switch in which a press member is fastened to the blade at the most advantageous point to give minimum change in operating pressure as the blade bends under the influence of the operating pressure, regardless of the point on the press member that the operating pressure is applied.

Another object of my invention is the provision of a blade through which a shaft may extend and pressure may be exerted on the blade at any point about the shaft without exerting excessive internal strain in the blade.

Another object of my invention is the provision of a blade for a switch in which a press member is fastened to the blade for preventing excessive bending and thereby breakage of the blade.

Other objects and a fuller understanding of my invention may be had by referring to the following description and claims, taken in conjunction with the accompanying drawing, in which:

Figure 1 of my drawings is a front-elevational view of my switch;

Figure 2 of my drawings is a side-elevational view of my throw-out switch, the switch being shown in cross-section with the actuating device holding the switch closed;

Figure 1:
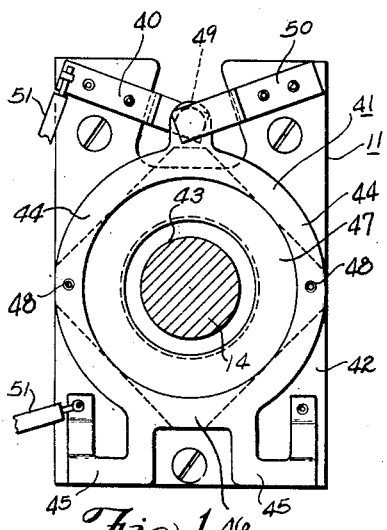
Figure 2:
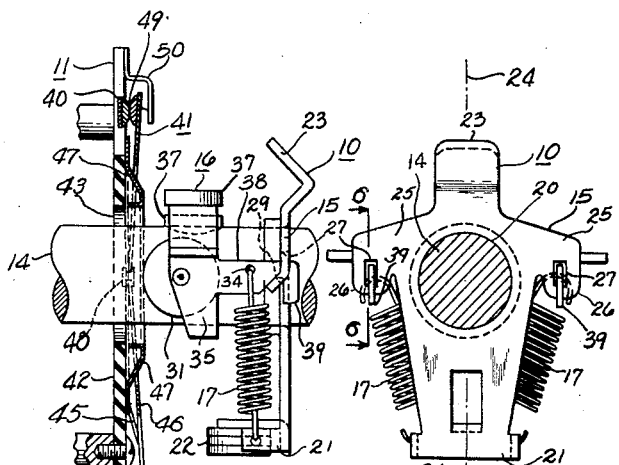
Figure 5:
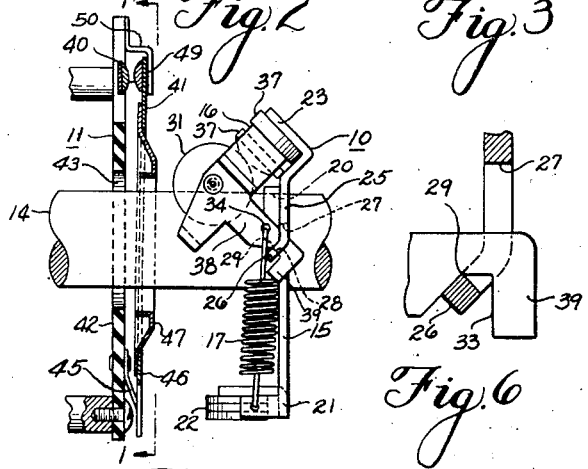
Figure 5 is a side-elevational view of my throw-out switch showing the actuating member pivoted away from the shaft to allow the switch to be open.

My centrifugally operated throw-out switch, for disconnecting the starting winding of an electrical motor when the shaft of the motor reaches a predetermined speed, comprises in general an actuating device 10 and a switch 11. The actuating device 10 is carried by the motor shaft 14. The switch 11 may be supported by a motor housing, or other suitable support means. The actuating device 10 operates to hold the switch 11 closed until the motor shaft 14 reaches a predetermined speed. The position of the actuating device in relation to the switch 11 while the switch is closed is best illustrated in Figure 2 of my drawings. When the motor reaches the predetermined speed the actuating device 10 operates to release the switch 11 and allow it to open, as illustrated in Figure 5, thus disconnecting the starting winding of the motor. Although I am describing my preferred centrifugally operated throw-out switch for specifically disconnecting the starting winding of an electric motor, I do not thereby limit the use of my invention. A throw-out switch embodying the features of my invention may be employed with rotating mechanisms to connect or disconnect an electrical circuit.

My centrifugally operated actuating device 10, as illustrated in the drawing, comprises a support bracket 15 secured to the motor shaft 14, an actuating member 16 pivotally mounted on the support bracket 15, and springs 17 operatively interconnecting the support bracket 15 and the actuating member 16. When the motor shaft 14 reaches a predetermined speed, the actuating member 16 is thrown out from the motor shaft 14 and against the urgency of the spring 17 by centrifugal force exerted on the actuating member 16. This centrifugal force, tending to throw the actuating member 16 away from the shaft 14, causes the actuating member 16 to pivot on the support bracket 15.

The support bracket 15 has an opening 20 therein through which the motor shaft 14 extends. Although other methods, such for example as welding or brazing may be used, I have secured the support bracket 15 to the motor shaft 14 by a press fit. The support bracket 15 may be constructed from sheet metal, or other suitable material. A weighted portion 21 of the support bracket 15 extends outwardly from the motor shaft 14 on one side thereof and has weights 22 fastened thereto. These weights 22 may be of any suitable material and have correct weight values to substantially balance the actuating device 10 on the motor shaft 14. The stop portion 23 is provided on the opposite side of the motor shaft 14 and is an integral portion of the support bracket 15. As is illustrated in Figure 5 of my drawings, this stop portion 23 is designed to stop movement of the actuating member 16 after it has been pivotally thrown away from the motor shaft 14 by the centrifugal force exerted thereon.

Figure 3:
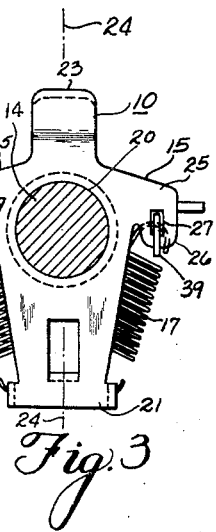
Figure 3 is a front-elevational view of my actuating device.
Figure 4:
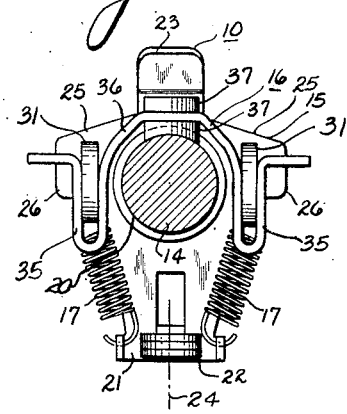
Figure 4 is a back-elevational view of my actuating device.

For purposes of description, I have indicated a center line 24 in Figures 3 and 4 of my drawings which extends through the center of the shaft 14 and from the weighted portion 21 to the stop portion 23 of the support bracket 15. Support portions 25 are located on either side of this center line 24 and extending outwardly from the shaft 14. These support portions 25 of the support bracket 15 and the weighted portion 21 have their surfaces substantially in a plane, which may be referred to as the plane of the support bracket 15. The support bracket 15 is disposed in a plane substantially perpendicular to the axis of the motor shaft 14.

The actuating member 16 must suddenly throw out or pivot away from the motor shaft 14 without any hesitation to have my centrifugally operated throw-out switch disconnect the starting winding surface at the predetermined speed. I have provided a pivot knife edge incorporated in the support bracket 15 for the actuating member 16 to pivot on. These sharp knife edges 29, on which the actuating member 16 pivots, are incorporated in a tab portion 26 of each support portion 25. An opening 27 is punched through the support portion 25 and the tab portion 26. The tab portion 26 is bent at this opening 27 and relative to the support portion 25 whereby the wall 28 of the opening 27 and the surface of the tab portion 26 intersect to form a sharp pivot knife edge. These surfaces of the tab portion 26 are disposed in a plane which is at an angle to the plane of the support bracket.

The actuating member 16 is designed to saddle the motor shaft 14. For descriptive purposes I have designated the actuating member 16 as having a center portion 36 with a side portion 35 on either side thereof. This center portion 36 and the side portion 35 saddle or extend partially about the motor shaft 14. The side portions 35 have arm portions 38 integral therewith and disposed to engage the knife edges 29 on the support bracket 15. When the actuating member is in its initial position, the arm portions 38 are disposed on opposite sides of the motor shaft and with their center line substantially parallel to the axis of the shaft when the switch is closed. When the motor reaches a predetermined speed and the actuating member 16 is thrown out from or snapped away from the shaft, the center line of the arm portions 38 will be at an angle to the axis of the shaft.

Figure 6:
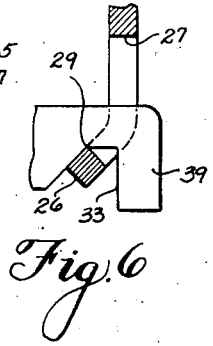
Figure 6 is a fragmentary enlargement along the lines 6—6 of Figure 3, illustrating the pivot knife edge.

I have discovered that by bending the tab portions of the support bracket I can pivot the arm portions 38 on the knife edge 29 without hitting either the wall 28 of the opening 27 or the surface of the tab portion. The angle at which the tab should be bent relative to the support portion depends on the degree of pivot movement of the arm portions 38. In Figure 6 of my drawings, I have illustrated an enlarged fragmentary cross-sectional view of the tab portion 26 and the support portion 25 with the arm portion 38 engaging the knife edge 29.

The arm portions 38 are terminated in the form of hooks 39. The length of the hooks 39 is longer than the length of the opening 27. To assemble the actuating member 16 with the support bracket 15, the arm portions 38 are held with the centerline thereof substantially parallel to the plane of the bracket 15. The ends of the hooks 39 may then be inserted through the openings 27. However, when thus assembled, and the bracket 15 inserted on the shaft 15, the arm portions 38 are held at an angle to the plane of the bracket 15, and the hook ends 39 cannot be withdrawn through the openings 27.

I have provided the arm portions 38 of the actuating member 16 with notches 33. These notches pivotally engage the knife edge 29 and prevent the arm portion 38 sliding thereon. The sides of the notch are spaced to permit the required pivotal movement of the actuating member 16 on the sharp knife edge 29. The spring 17 is fastened to the arm portion 38 by inserting one end of the spring 38 through a spring opening 34 in the arm portion 38. The other end of the spring is similarly fastened to the weighted portion of the support bracket. This spring opening 34 in the arm portion 38 is located between the notch 33 and the side portion 35 of the actuating member 16. When the motor is rotating at a speed below the predetermined speed the spring holds the actuating member 16 against the motor shaft 14. The position of the actuating member 16 and the spring 17 when the motor is running below the predetermined speed is best illustrated in Figure 2 of my drawings. The force of the spring exerted to hold the actuating member 16 against the motor shaft 14 and thus hold the switch 11 closed is greatest when the motor is rotating below the predetermined speed. At this time the urgency or restraining tension of the spring, or that force exerted by the spring on the arm portion 38 is substantially perpendicular to the arm portions 38 and in a line at a maximum distance from the pivot knife edge 29. When the actuating member 16 is thrown out from the motor shaft 14 by centrifugal force, thereby causing it to pivot about the sharp knife edge 29, the distance between the lines of force exerted by the spring and the knife edge 29 decreases. As this distance decreases the effect of the urgency of the spring on holding the actuating member 16 against the motor shaft 14 decreases. Thus it can be seen that the combination of the centrifugal force exerted on the actuating member 16 with the decrease in the urgency of the spring to retain the actuating member 16 against the motor shaft will cause the actuating member 16 to substantially throw out from the shaft. By using this combination of the centrifugal force and the decreasing urgency of the spring on the actuating member, I have been able to construct an actuating device which will quickly act with snap-like operation. The actuating member 16 will throw out or snap away from the motor shaft 14 exactly at the predetermined speed and without any hesitancy to allow the switch 11 to quickly open and thereby disconnect the starting windings exactly at that predetermined speed.

The center portion 36 of my actuating member 16 has stop fibers 37 fastened thereto. These stop fibers 37 ride the motor shaft 14 when the switch is closed with the actuating member 16 against the motor shaft. When the actuating member 16 snaps or pivots away from the motor shaft 14, the stop fibers 37 engage the stop portion 23 of the support bracket 15. The amount of pivotal movement of the actuating member 16 between the motor shaft 14 and the stop portion 23 may be controlled by varying the dimensions of these stop fibers. In actual practice I have constructed these stop fibers of leather or other similar material which will not damage the shaft as it rotates.

Riders 31, constructed of fibrous or other similar material are fastened to the side portions 35 of the actuating member 16 to engage the switch 11 while the actuating member 16 is positioned against the motor shaft 14. Balance weights may be fastened to the side portions 35 to cooperate with the resisting tension or urgency of the springs 17 for setting the actuating member 16, whereby it throws out or snaps pivotally from the motor shaft 14 at a desired predetermined speed. The combination of these balance weights and the springs 17 may be used to adjust the actuating device 10.

My switch 11, as illustrated in the drawings, comprises in general a contact member 40 and a blade 41 supported by an insulation support member 42. The insulation support member 42 may be fastened to the motor framework or other structure and has an opening 43 through which the shaft 14 of the motor extends. The contact member 40 is fastened on one end of the support member 42 and the blade 41 is fastened on the other end of the support member 42. A stop member 50 may be fastened to the support member 42 to control movement of the blade. The blade moves between the contact member 40 and this stop member 50. The switch may be connected to any electrical circuit by fastening circuit wires 51 to the contact member 40 and to the blade 41.

The blade 41 is described as having side arm portions merging into a contact portion 49 which contacts the contact member 40. The side arm portions 44 extend one on either side of the motor shaft 14 and have substantially U-shaped fastening portions 45 on the fastening ends thereof. I have provided a brace 46 extending between the side arm portions 44 to cause the blade to completely encircle the shaft 14. The purpose of this substantially U-shaped fastening portion 45 is to provide a longer springing action in the switch blade 41 without having to increase the over-all length of the switch blade 41. By thus substantially increasing the length of the springing action of the blade 41, breakage at the point of fastening the blade to the support member 42 is materially decreased. These fastening portions 45 have one end integrally merging with the side arm portions 44 and the brace 46 and the other end secured by rivets or other suitable means to the support member 42.

A press member 47 extends about the shaft 14 and between the side arm portions 44. This press member 47 may be riveted or otherwise fastened to the side arm portions 44. A line drawn between the points of fastening 48 of the press member 47 to the side arm portions 44 of the blade 41 is substantially perpendicular to a line drawn between the contact portion 49 and the fastening portions 45. The riders 31 of the actuating member 16 engage this press member 47 as they are rotated by the shaft 14. The press member permits the riders to hold the contact or switch blade 41 with the contact portion 49 against the contact member 40 without springing the blade back and forth as the riders 31 are rotated by the motor shaft 14. As is best illustrated in Figure 2, the press member 47 has a substantially flat surface which the riders 31 engage. The blade 41 springs or bends to insure a contact closure of the switch 11 when the riders 31 are engaging the blade 46.

When the motor shaft 14 reaches the predetermined speed, the actuating member 16 suddenly pivots away from or throws out from the motor shaft 14 and against the urgency of the spring 17 to permit the switch 11 to open, as illustrated in Figure 5. While the motor shaft 14 is rotating at or above this predetermined speed, the centrifugal force exerted will cause the actuating member 16 to continue its position away from the motor shaft 14, thus permitting the switch 11 to remain open. The contact portion 49 is held against the stop member 50 by the urgency of the blade 41 while the switch is open. As soon as the speed of the motor drops below this predetermined speed, the spring 17 will pull the actuating member 16 against the motor shaft 14 thus causing the switch 11 to reconnect the starting winding of the motor.

Many times it is desirable to have a centrifugally operated throw-out switch which may be connected to a motor to connect a circuit when the motor reaches a predetermined speed. This may be accomplished by connecting the lead wire 51 to the stop 50 and disconnecting it from the contact member 41. In other words the contact member 41 and the stop 50 are reversed whereby the switch will be open when the actuating member 16 is against the blade. The actuating member 16 will be against the blade when the motor is at a standstill or when running below a predetermined speed. When the motor is running at the predetermined speed or above the predetermined speed, the actuating member will be pivotally moved away from the blade thus permitting the switch to close. It is understood that my throw-out switch may be connected to any type motor having a revoluble shaft and may be used to connect or disconnect any electrical circuit.

Figure 7:
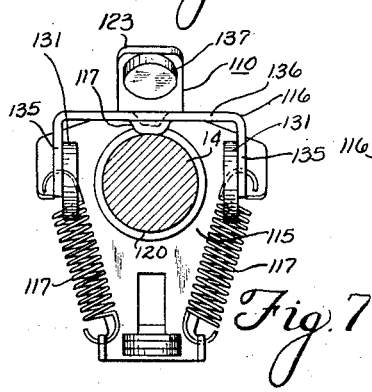
Figure 7 is a back elevational view of a modification of my actuating device.
Figure 8:
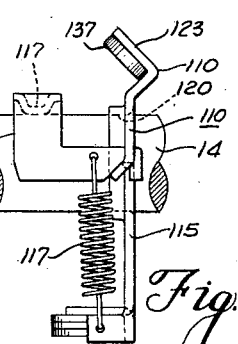
Figure 8 is a side elevational view of my modified actuating device.

In Figures 7 and 8 of my drawings I illustrate a modification of my actuating device. This modified actuating device 110 may be carried by the motor shaft 14. As with the preferred actuating device 10 my modified centrifugally operated actuating device 110 comprises a support bracket 115 adapted to be secured to the motor shaft 14, a modified actuating member 116 pivotally mounted on the support bracket 115 and springs 117 operatively interconnecting the modified support bracket 115 and the modified actuating member 116. The support bracket 115 has an opening 20 therein through which the motor shaft 14 extends. Although other methods, such for example as welding or brazing, may be used I have secured the support bracket 115 to the motor shaft 14 by a pressed fit. As with the preferred embodiment of my invention, my modified actuating device and support bracket may be constructed from sheet metal or other suitable material.

The stop portion 123 is integrally connected to the support bracket 115 and extends outwardly from the shaft 14 on one side thereof. The stop portion 123 has a stop fiber 137 fastened thereto by gluing or other suitable means, such for example, riveting. As is illustrated in Figures 7 and 8 of my drawings this stop portion 123 is designed to stop movement of the actuating member 116 after it has been pivotally thrown away from the motor shaft 14 by the centrifugal force exerted thereon. The actuating member 116 hits the stop fiber 137 when it is pivotally thrown away from the motor shaft 14. In my modified actuating member 116, I have a rider portion 117 which rides the motor shaft 14. This rider portion as indicated in Figures 7 and 8 may be formed by pressing a recess into the actuating member 116 and engages the motor shaft 14 when the switch is closed with the actuating member 116 against the motor shaft 14.

I have also simplified construction of my actuating member 116 by constructing it as a somewhat channel shaped member having a center portion 136 and side portions 135. The rider portion 117 is disposed in the center portion 136. The riders 131 which are similar to the riders 31 in the preferred embodiment of my invention are fastened to the side portions 135 of the modified actuating member 116 to engage the switch 11 while the actuating member 116 is positioned against the motor shaft 14. In general operation my modified actuating device, as illustrated in Figures 7 and 8, is synonymous with my preferred actuating device as illustrated in Figures 1 through 6.

In all embodiments of my invention, an important feature is the relation between the direction of the centrifugal actuating force and the direction of that force that the actuating member exerts to maintain pressure on the switch press member 47. It will be observed by reference to Figure 2 that the pressure exerted by the actuating member 16 on the press member 47 of the switch is substantially at right angles to the direction of the centrifugal force tending to move the actuating member 16. That is, the press member 47 pushes longitudinally against the actuating member 16, and therefore does not produce any tendency to pivot the actuating member 16 upon the knife edge 29.

It is obvious that being at right angles to the forces required to move the actuating member outwardly from the shaft, the reaction force of the switch blade can have no effect on the speed at which the actuating member begins to open. The important result of this arrangement is that the calibration of the centrifugally actuated member is substantially unaffected by variations in axial adjustment or strength of the switch blade.

When the actuating member 16 begins to move outwardly under the influence of centrifugal force, the right angle relationship of forces no longer holds, but this is immaterial, because once the member 16 has started to move outwardly, all forces including the reaction of the press member 47 will act to cause the outward motion of the actuating arm 16 to accelerate. Thus, the snap action movement of the actuating member 16 is aided once movement has begun, but is unaffected until centrifugal force actually starts the outward movement.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A throw-out switch for disconnecting the starting winding of an electric motor when the motor reaches a predetermined speed, said throw-out switch comprising, a support bracket adapted to be secured to the shaft of said motor to revolve therewith, a switch having an insulation support member carrying a contact member, a blade including arm portions each having one end thereof fastened to said support member and having the other end thereof merging into a contact portion engageable with said contact member, and an actuating member pivotally mounted on said support bracket for actuating said blade against said contact member, the axis of said pivotal mounting of the actuating member on the support member extending in a line substantially intersecting the axis of the shaft when the support member is secured thereto.

2. A throw-out switch for disconnecting the starting winding of an electric motor when the motor reaches a predetermined speed, said throw-out switch comprising, a support bracket adapted to be secured to the shaft of said motor to revolve therewith, a switch having an insulation support member carrying a contact member, a blade including arm portions each having one end thereof fastened to said support member and having the other end thereof merging into a contact portion engageable with said contact member, a press member carried by said arm portions and fastened thereto between the contact portion and the end fastened to the support member, and an actuating member pivotally mounted on said support bracket and engageable with said press member, said actuating member pivoting away from said press member, the axis of said pivotal mounting of the actuating member on the support member extending in a line substantially intersecting the axis of the shaft when the support member is secured thereto.

3. A blade for an electrical switch comprising, a first arm and a second arm, said arms each having a fastening portion on one end thereof doubling back on itself, the other ends of said arms being integral thus forming a contact portion, a press member disposed between said first and second arms and means for pivotally securing said press member to the first and second arms substantially intermediate said contact portion and said fastening portion.

4. An electrical switch comprising, a contact member, a blade, insulation support means for supporting said contact member and said blade in operative relationship, means for securing said contact member to a first end of the support, said blade having arm portions integral at one end thereof thus forming a contact portion at one end thereof and terminating in fastening portions at the other ends thereof, each of said fastening portions of the said arms doubling back thereon, means for securing the fastening portions to a second end of the insulation support, a press member disposed in the plane of said arms and therebetween, and means for pivotally securing said press member to said arms intermediate the ends thereof.

5. In a switch adapted to be operated by an actuating device secured to the shaft of a motor, the provision of, a blade disposed in a plane substantially perpendicular to the axis of the shaft and having a center portion extending about the shaft, said blade having a contact portion integral with the center portion and extending outwardly therefrom and having substantially U-shaped fastening portions, one end of each of the said U-shaped fastening portions being integral with the center portion and substantially opposite the contact portion, the other end of each of the U-shaped fastening portions being secured to a switch support, a press member pivotally secured to the center portion on opposite sides thereof with the line of securement substantially perpendicular to a line drawn between the contact portion and the fastening portions of the blade, said press member cooperating with the actuating member to move the blade for operating the switch while the actuating member is being rotated on the shaft.

6. In a throw-out switch for disconnecting the starting winding of an electric motor when the shaft of the motor reaches a predetermined speed, the provision of a support bracket adapted to be secured to the motor shaft and rotate therewith, said support bracket having a weightable portion on one side thereof extending outwardly from the shaft, said support bracket having support portions extending outwardly therefrom on opposite side thereof and annularly spaced one on either side of the weightable portion, said support portions and said weightable portion being in a first plane substantially perpendicular to the axis of the shaft, said support portions each having a tab portion with an opening therein, said tab portions being in a second plane disposed at an angle to the first plane, a wall of said opening and one surface of the tab forming a knife edge therebetween, an actuating member having extending portions engaging the knife edges in the tabs, said knife edges coextending in a line intersecting substantially the axis of the shaft, said extending portions being normally disposed substantially parallel to the axis of the shaft, and spring means between said extending portions and said weightable portion of the support bracket to normally hold the actuating member against the shaft.

7. An actuating device comprising, a support bracket for pivotally supporting an actuating member, said support bracket having at least a tab portion disposed at an angle to the support bracket, said tab portion having an opening therein defining a wall within said tab portion and at substantially a right angle to the surface of said tab portion, said wall and said surface forming a knife edge therebetween and on which the said actuating member may be pivotally supported substantially at a right angle to the support bracket, said knife edges coextending in a line intersecting substantially the axis of the shaft, and spring means connected to said actuating member at a lever arm length from said knife edges and to said support bracket for restraining pivotal movement of said actuating member, the lever arm length decreasing as the actuating member pivots from a position substantially at right angles to the support bracket.

8. A centrifugal switch mechanism attachable to the shaft of a motor, said mechanism comprising, a switch having a blade means, a support adapted to be rotatably carried by the shaft and having pivot edges in the same plane as and coextending in a line intersecting substantially the axis of the shaft, arms extending in said plane and between the pivot edges and the blade means and contacting the blade means substantially in said plane when said shaft is rotating below a predetermined speed, and weighted means carried by said arm for centrifugally pivoting said arms out of said plane and away from said switch blade means.

9. A centrifugal switch mechanism attachable to the shaft of a motor, said mechanism comprising a switch support member carrying a contact member and carrying a blade including arm portions each having one end thereof fastened to said support member and having the other end thereof merging into a contact portion engageable with said contact member, a press member carried by said arm portions and fastened thereto between the contact portion and the end fastened to the support member, a support adapted to be rotatably carried by the shaft and having pivot edges in the same plane as and coextending in a line intersecting substantially the axis of the shaft, arms extending in said plane between the pivot edges and the press member and contacting the press member substantially in said plane when said shaft is rotating below a predetermined speed, and weighted means carried by said arms for centrifugally pivoting said arms out of said plane and away from said press member.

10. A centrifugal switch mechanism attachable to the shaft of a motor, said mechanism comprising, a switch having a blade means, a support adapted to be rotatably carried by the shaft and having pivot edges in a plane substantially parallel to the axis of the shaft and coextending in a line intersecting substantially the axis of the shaft, arms extending in said plane and between the pivot edges and the blade means and contacting the blade means substantially in said plane when said shaft is rotating below a predetermined speed, and weighted means carried by said arm for centrifugally pivoting said arms out of said plane and away from said switch blade means.

11. A centrifugal switch mechanism attachable to the shaft of a motor, said mechanism comprising a switch support member carrying a contact member and carrying a blade including arm portions each having one end thereof fastened to said support member and having the other end thereof merging into a contact portion engageable with said contact member, a press member carried by said arm portions and fastened thereto between the contact portion and the end fastened to the support member, a support adapted to be rotatably carried by the shaft and having pivot edges in a plane substantially parallel to the axis of the shaft and coextending in a line intersecting substantially the axis of the shaft, arms extending in said plane between the pivot edges and the press member and contacting the press member substantially in said plane when said shaft is rotating below a predetermined speed, and weighted means carried by said arms for centrifugally pivoting said arms out of said plane and away from said press member.

12. A blade for an electrical switch comprising, a first arm and a second arm, said arms each having a fastening portion on one end thereof, the other ends of said arms being connected together thus forming a contact portion, a press member disposed between said first and second arms and means pivotally securing said press member to the first and second arms substantially intermediate said contact portion and said fastening portion.

13. An electrical switch comprising, a contact member, a blade, insulation support means for supporting said contact member and said blade in operative relationship, means for securing said contact member to a first end of the support, said blade having arm portions integral at one end thereof thus forming a contact portion at one end thereof and terminating in fastening portions at the other ends thereof, means for securing the fastening portions to a second end of the insulation support, and a press member pivoted to said arms and extending therebetween.

14. An electrical switch comprising, a contact, a blade, an insulation support supporting said contact and said blades in operative relationship, said blade having arms terminating in fastening portions on one end thereof, means for securing said fastening portions to said insulation support at a distance from said contact, a contact portion connecting the other ends of the arms of said blade and engageable with said contact, and a press portion pivotally joined to the said arms and extending therebetween.

EDWARD J. SCHAEFER.

REFERENCES CITED

The following references are of record in the file of this patent:

UNITED STATES PATENTS

| Number | Name | Date |
|---|---|---|
| 2,180,022 | Streck | Nov. 14, 1939 |
| 2,184,412 | Conley | Dec. 26, 1939 |
| 2,215,294 | Morrill | Sept. 17, 1940 |
| 2,243,577 | Pepper | May 27, 1941 |
| 2,305,441 | Pepper | Dec. 15, 1942 |